July 25, 1961      E. E. LEGER      2,993,947
GALVANIC CELL ANODE AND METHOD OF MAKING THE SAME
Filed Oct. 9, 1957      2 Sheets-Sheet 1

INVENTOR.
ERNEST E. LEGER
BY
ATTORNEY

July 25, 1961 E. E. LEGER 2,993,947
GALVANIC CELL ANODE AND METHOD OF MAKING THE SAME
Filed Oct. 9, 1957 2 Sheets-Sheet 2

INVENTOR.
ERNEST E. LEGER
BY
John F. Holmman
ATTORNEY

United States Patent Office 2,993,947
Patented July 25, 1961

2,993,947
GALVANIC CELL ANODE AND METHOD OF MAKING THE SAME
Ernest E. Leger, Cleveland, Ohio, assignor to Union Carbide Corporation, a corporation of New York
Filed Oct. 9, 1957, Ser. No. 689,086
4 Claims. (Cl. 136—107)

This invention relates to an anode-electrolyte system, and to an assembly method for cylindrical cells using this system. More specifically, this invention is concerned with an anode consisting of an aggregate of consumable metal particles.

In the manufacture of galvanic cells, it is desirable that the capacities of the cathode and anode thereof be balanced or that a slight over-balance of cathode capacity be provided. By making certain that complete consumption of the anode metal occurs before the cathode is exhausted, the possibility of cell gassing is eliminated.

A further requirement, especially in dry cells, for producing a high capacity unit is the provision of space in the cell for sufficient electrolyte. In the case of cells using an alkaline electrolyte, the problem of providing sufficient electrolyte space is found to be particularly critical in cylindrical cells of conventional dimensions and in those constructions where the anode and cathode materials are arranged concentrically.

As is well known, alkaline-zinc dry-cell systems are generally limited to the use of anodes which consist of a zinc powder aggregation. Solid one-piece zinc anodes are found to be impractical because of the electrochemical reaction product; namely, zinc oxide, which is created on the active surface of the anode and which soon renders the cell inoperative by blocking off the active metal.

In prior art, it has generally been the practice in the manufacture of alkaline-zinc cells to form the anode structure from a uniform mixture consisting of amalgamated zinc powder dispersed, or suspended in an alkaline electrolyte gel. While such uniform anode-electrolyte structures have been successfully used in certain flat type cells of limited capacity wherein the anode and cathode materials are not arranged concentrically, their use in cylindrical cells of such configuration as the "D" size dry cell leave much to be desired.

It has been found in accord with the present invention that, to insure an overbalance of cathode capacity without simultaneously diminishing cell service, the anode can be limited without reducing the amount of electrolyte available thereto. This is achieved, in the practice of the invention, by an anode-electrolyte arrangement wherein anodic material is concentrated close to the surface of the separator adjacent the surrounding cathode with the remainder of the electrolyte being located largely in a central cavity.

It is, therefore, an object of the present invention to provide a dense conductive cylindrical anode composed of aggregates of consumable metal held in a semi-rigid state by a binding agent compatible with the electrolyte.

An equally important object of the present invention is a method of assembling cylindrical dry cells of improved service capacity and shelf characteristics employing this anode.

These and other related objects and advantages of the invention will become more apparent as the description thereof proceeds, particularly when taken in conjunction with the accompanying drawing wherein.

The anode of the invention is composed of a mixture of an amalgamated consumable anodic metal such as zinc metal and a water soluble binder such as sodium carboxymethyl cellulose.

The anode tube is formed by pressure extruding the bonded mixture of metal powder without the addition of heat. This tube is positioned in the central cavity in the cell, completely bathed and surrounded by the cell electrolyte which fills the remaining cavity space. The electrolyte is modified by the addition of a thickening agent, such as sodium carboxymethyl cellulose. The tubular anode mass is of such consistency that it may easily be handled as a distinct and separate part for assembly.

Figure 1:
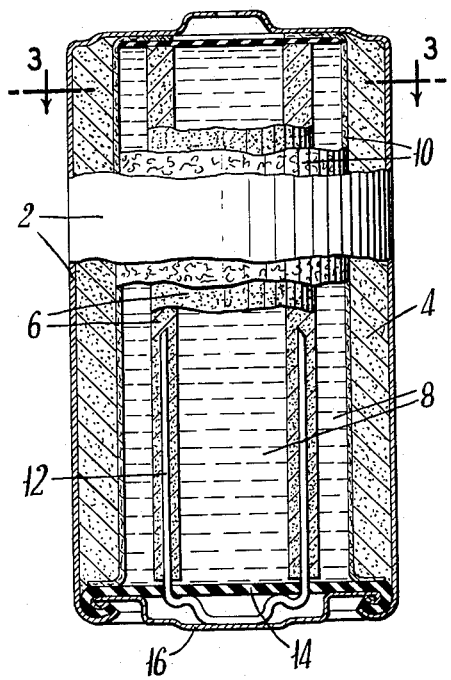
FIG. 1 is an elevational section of a cell employing the anode of the invention shown before the same has reached equilibrium.

As shown in FIG. 1, a dry cell containing the anode of the invention comprises a steel can 2, a cathode 4, an anode shown as extruded 6, a clear electrolyte gel 8 surrounding the anode, a barrier layer 10, a brass anode collector 12, a seal washer 14 at the bottom of the cell, an anode cover 16 in contact with the seal washer 14 and maintained in place by crimping the end of the can. The brass anode collector 12 is shown in contact with the cover 16, and extending into the anode.

The cathode is of the cement-bonded type disclosed and claimed in the co-pending application of K. Kordesch, Serial No. 689,082, filed October 9, 1957, now U.S. Patent 2,962,540, issued November 29, 1960.

The preferred practice of the invention is to extrude a tube composed of a mixture of metal powder bonded with a weakly alkaline solution of sodium carboxymethyl cellulose. The tube is formed in the proper size to meet the safety and quality requirements of the cell. While other sizes could be employed, the size found best for a "D" size cell was an outer diameter of 0.650" and an inner diameter of 0.397". The length of the tube would represent the height of the anode system within the cell. This tube can be used when extruded or it can be dried into a hard cement-like pipe to be used at a later date if desired. Performance was found to be essentially equivalent in either case. It has been found that a mixture in which the amalgamated metal aggregate comprises not less than 30% by volume, remains sufficiently rigid after extrusion and is sufficiently conductive. While the formulation presented below was used with success, any concentration of these materials that will provide a semi-rigid conductive extruded tube could be used.

| | |
|---|---|
| Metal powder (60–150 mesh) _____grams__ | 2500 |
| Metallic mercury _____do____ | 100 |
| Sodium carboxymethyl cellulose _____do____ | 169 |
| 0.5 percent potassium hydroxide solution __cc____ | 150 |
| Water _____cc____ | 350 |

The procedure for making the anode extrusion material as per the above formula is to wet and tumble the anodic metal powder with the 0.5 percent alkaline solution for 1 to 2 minutes. This slight amount of alkali prepares the metal for amalgamation. If higher concentrations of alkali, such as cell electrolyte, were to be added at this point undesirably high oxidation of the metal may take place. The metallic mercury is then added and the composite tumbled an additional 1 to 2 minutes to insure good amalgamation of the metal powder. The sodium carboxymethyl cellulose is then added slowly and thoroughly mixed into the mass. Water is then added and the entire composition mixed for 15 minutes. While a range of metal powder size can be employed, a range of approximately 60–150 mesh is preferred.

The formula for the preferred thickened electrolyte is presented below:

|  | Grams |
|---|---|
| Potassium hydroxide solution (39 Bé.) (4,000 cc.) | 5,460 |
| Sodium carboxymethyl Cellulose (CMC) | 100 |
| Zinc oxide (C.P.) | 113 |
| Total | 5,673 |

The procedure for making the electrolyte consists in sifting the CMC and the zinc oxide slowly into the adequately stirred alkaline solution. After all the ingredients are together, the mass is stirred at approximately 200° F. for 15 minutes. The solution is then allowed to stand 24 hours for cooling and separation of entrapped gases. The zinc oxide suppresses the corrosion of the zinc metal anode material in the finished cell.

The process involved in filling the anode compartment consists of flowing the required amount of the above described electrolyte into the anode cavity and then pushing the extruded anode tube into the anode cavity and through the electrolyte. This process forces electrolyte up between the anode tube and the cathode and also up inside the tube (see FIG. 1). The net result is a non-homogeneous anode-electrolyte system comprised of a reservoir of viscous electrolyte and a porous annulus of amalgamated metal anode powder permeated with the viscous electrolyte; the volume of said amalgamated metal constituting not less than 30 percent of said annulus prior to permeation. Contact with the anode can be made by several means. In this case, the anode collector consists of a copper wire pushed into the zinc anode and connected to an insulated negative terminal-closure. The anode-electrolyte system of this invention shows definite advantages in cell capacity and safety from gassing on continuous discharge over the combinations of homogeneous anode-electrolyte structure described earlier. These advantages can be readily seen in Table I, where the several cell types were placed on continuous 2.25 ohm load until complete discharge of the cell. This test is commonly used as a comparative breakdown test for flashlight cells.

Table I

|  | 2.25 Ohm Load—Continuous | | |
|---|---|---|---|
|  | Min. Service | | Gas Evolved below 0.3 v., cc. |
|  | to 0.9 v. | to 0.65 v. | |
| Homogeneous Anode System: | | | |
| (1) Cathode Capacity approx. equal to anode capacity. (Insufficient anode electrolyte.) | 730 | 965 | 0 |
| (2) Optimum cathode size with anode metal limitation (poor anode conductivity) | 0 | 0 | 0 |
| (3) Anode capacity higher than cathode capacity. More electrolyte than in 1 | 780 | 1,250 | [1] 600 |
| Non-homogeneous Anode-Electrolyte System of this Invention | 950 | 1,482 | 0 |

[1] Av.

Figure 2:
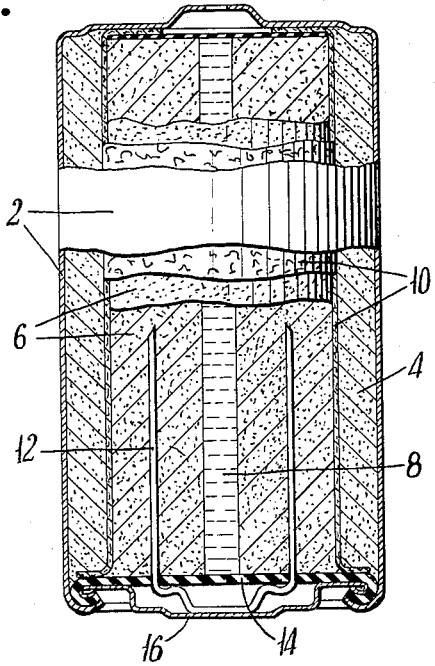
FIG. 2 is the same as the above for the cell of FIG. 1 after the same has attained equilibrium.

The service capacity advantages obtained with the recommended anode-electrolyte system of this invention can be adequately explained by consideration of the process through which such a cell must come to equilibrium after manufacture. Diagrams of the proposed cell before and after equilibrium are presented in FIGS. 1 and 2, respectively. By proper control of the sodium carboxymethyl cellulose solution binder in the extruded anode tube, a substantial swelling action is obtained as the sodium carboxymethyl cellulose (6 in FIGS. 1, 2 and 3) takes up electrolyte from the reservoir (8 in FIGS. 1, 2 and 3) to come to equilibrium. As a result of this swelling action, electrolyte is pushed through the paper separator barrier and a gentle pressure is exerted against it insuring maximum contact at both anodic and cathodic surfaces. After expansion of the anode tube in coming to equilibrium the anodic metal mass occupies an annular space defined by the separator and the remaining electrolyte reservoir at the center of the anode electrolyte chamber. In addition, by proper dimensioning of the extruded anode tube, the amount of electrolyte positioned between the anode and the cathode can be controlled to provide optimum wetting.

The expansion of the extruded anode tube in coming to equilibrium is such that the anodic metal is concentrated at the outer periphery of the anode compartment and remains as close to the cathode as possible. This situation places the anode metal in the location of highest efficiency. The shelf advantages presented by a "D" size cell having this gentle pressure exerted against the separator barrier by the anode material over a similar cell which is assembled at approximate equilibrium, as is the case with a homogeneous anode-electrolyte can be readily seen from the flash current values obtained one day and two weeks after cell manufacture. These data are presented in Table II.

Table II

|  | Flash Current, amps. | |
|---|---|---|
|  | 1 Day | 2 Weeks |
| Uniform Anode System | 27 | 23 |
| Recommended Two-Part Anode System | 22 | 28 |

The described anode tube extrusion process is easily adaptable to a highly mechanized assembly of cells. Initial techniques attempted for accomplishing anode limitation without restricting the anode electrolyte consisted of dispensing the proper amount of homogeneous anode-electrolyte mixture containing an amalgamated metal powder anode material suspended in sodium carboxymethyl cellulose and alkaline electrolyte in an annulus zone lining the inner surface of the separator. The cylindrical space within this zone was simultaneously filled with gelled electrolyte made of sodium carboxymethyl cellulose, alkaline electrolyte and zinc oxide. The concentrations of gelling agent and electrolyte in both the anodic gel and the electrolyte gel were equal. This technique provided a system that was at approximate ionic equilibrium at the time of manufacture. The benefits of a mobile and swelling action were not available and consequently no quality advantages, other than the elimination of gassing on continuous drains, were obtained over the use of a homogeneous anode-electrolyte system. In addition, the dispensing of this two-part structure consisting of an anode gel annulus and a gelled electrolyte core in equilibrium presented many difficult mechanization problems. Gel viscosity of both the anode gel and the gelled electrolyte, the age of the gels, the temperature of the gels, etc., had to be carefully controlled in order to get proper ratios of anodic gel to electrolyte gel. These problems do not exist with the extruded semi-rigid anode tube process.

Figure 3:
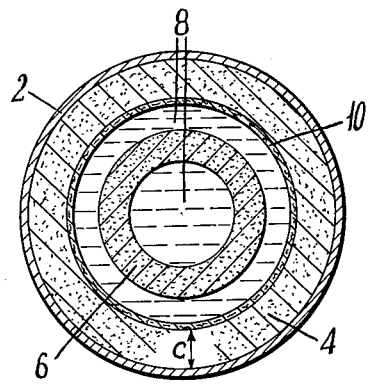
FIG. 3 is a section taken along the line 3—3 of FIG. 1.
Figure 4:
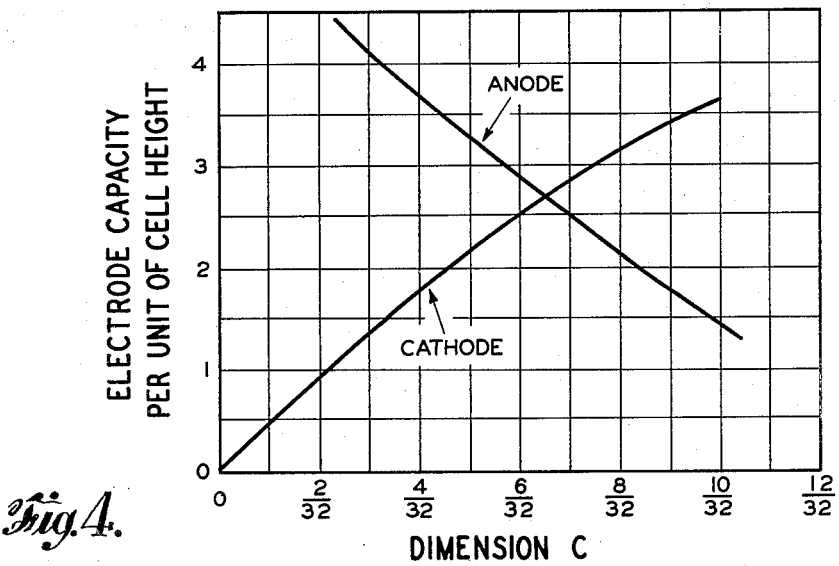
FIG. 4 is a graph showing the relationship between certain cell factors and cell capacity.
Figure 5:
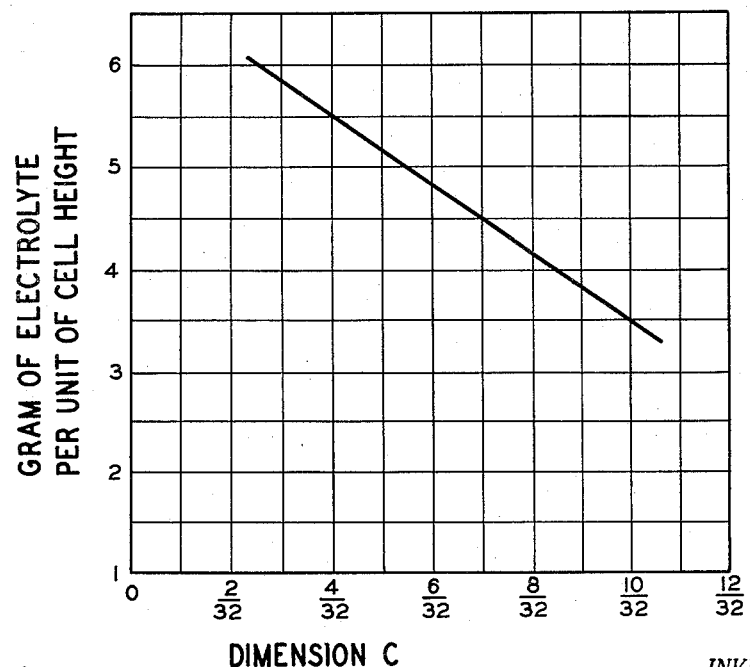
FIG. 5 is a graph illustrating the relationship between cathode wall thickness and the total amount of electrolyte contained in the cell.

That the optimum combination of freedom from gassing and maximum cell capacity cannot be obtained with the uniform anode-electrolyte structure in a "D" size cell was shown when a series of external cathode type alkaline-manganese dioxide-zinc cells were constructed in which the cathode wall thickness was varied over a range of ampere hour capacities. Internal structure of these cells is illustrated in FIGURE 3 in which a plane section normal to the cell axis is shown. In FIGURE 4 the relationship between cathode wall thickness (dimension "C," in FIG. 3) and the theoretical anode metal and cathode depolarizer ampere hour capacity is shown for an empirical unit of cell height. In FIGURE 5 the relationship between the cathode wall thickness and combined amount of electrolyte contained in the anode-electrolyte cavity and in the pores of the cathode mix is shown. The depolarizer mix consisted of carbon-manganese ore mix containing roughly 57 percent $MnO_2$. The homogeneous anode-gelled electrolyte structure consisted of a heavy suspension of approximately 50 parts by weight of amalgamated zinc powder in 50 parts of 9 normal potassium hydroxide electrolyte containing 6 percent sodium carboxymethyl cellulose.

It will be seen from FIGURE 5 that if the wall thickness of the cathode is less than about 9/32", the anode capacity is in excess of the cathode capacity; thus, gassing will result when the depolarizer is depleted if discharge of the cell is continued. A cell having a 5/32" cathode wall contained 5.2 g. of electrolyte per unit of cell height and produced 80–85 percent of the service life of a cell containing the anode of this invention before gassing occurred.

It will also be seen from FIGURES 4 and 5 that when a wall thickness of 9/32" is used, the anode capacity and the cathode are approximately equal; however, at this wall thickness, only about 4.8 grams of electrolyte can be present per unit of cell height. With this amount of electrolyte, the cell is limited to 65–75 percent of the capacity possible from a cell made with the anode of our invention.

While these specifications have illustrated the invention mainly by reference to anodes containing zinc as the anodic material, sodium carboxymethyl cellulose as the water soluble binder or thickening agent and potassium hydroxide as the electrolyte, it should be understood that the same is not limited thereto. Thus metals near zinc in the electromotive series as well as various alloys may be used as the anode material. Similarly other thickening agents well known in the art be employed in the practice of the invention, including casein, hydroxy ethyl cellulose polyvinyl acetate latex and the like. Obviously too electrolytes equivalent to potassium hydroxide can be used in variants of the present invention without departing from the scope thereof.

From the above description, it will therefore be understood that according to this invention, novel anode-electrolyte systems are provided as well as new methods of producing the same, all to the end that the service capacity and shelf characteristics of the cell may be extended.

What is claimed is:

1. An electrolyte-swellable anode-electrolyte system comprising a reservoir of viscous electrolyte and a porous annulus comprising finely divided amalgamated anodic metal permeated with said viscous electrolyte, said porous annulus having a volume substantially greater than its volume prior to be permeated, the volume of said amalgamated metal constituting not less than 30 percent of said annulus prior to permeation.

2. The system of claim 1 wherein said anode is tubular.

3. A semi-rigid dry cell anode comprising about 2,500 parts by weight of finely divided anodic material, but in any event not less than 30 percent by volume of said anode, about 100 parts by weight of metallic mercury, about 169 parts by weight of sodium carboxymethyl cellulose, about 150 parts by volume of 0.5 percent potassium hydroxide solution, and about 350 parts by volume of water.

4. The combination in a dry cell employing a cement-bonded cathode of an anode-electrolyte system comprising a reservoir of viscous alkaline electrolyte and a porous annulus comprising finely divided amalgamated anodic metal permeated with said electrolyte and barrier means between said cathode and anode system, the volume of said amalgamated metal constituting not less than 30 percent of said annulus prior to permeation.

References Cited in the file of this patent

UNITED STATES PATENTS

| | | |
|---|---|---|
| 2,422,045 | Ruben | June 10, 1947 |
| 2,480,839 | Daniel | Sept. 6, 1949 |
| 2,536,696 | Ruben | Jan. 2, 1951 |
| 2,542,574 | Ruben | Feb. 20, 1951 |
| 2,542,576 | Ruben | Feb. 20, 1951 |
| 2,641,624 | Winckler et al. | June 9, 1953 |